Oct. 27, 1959   J. STEWART   2,910,678
ELECTRIC SIGNAL SELECTING AND INTEGRATING DEVICE
Original Filed April 13, 1953   2 Sheets-Sheet 1
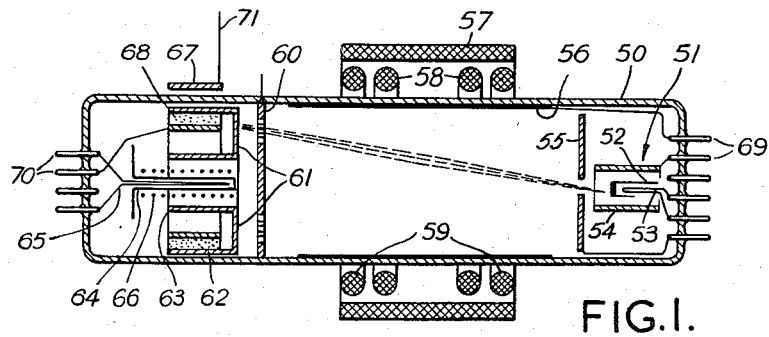
FIG.I.
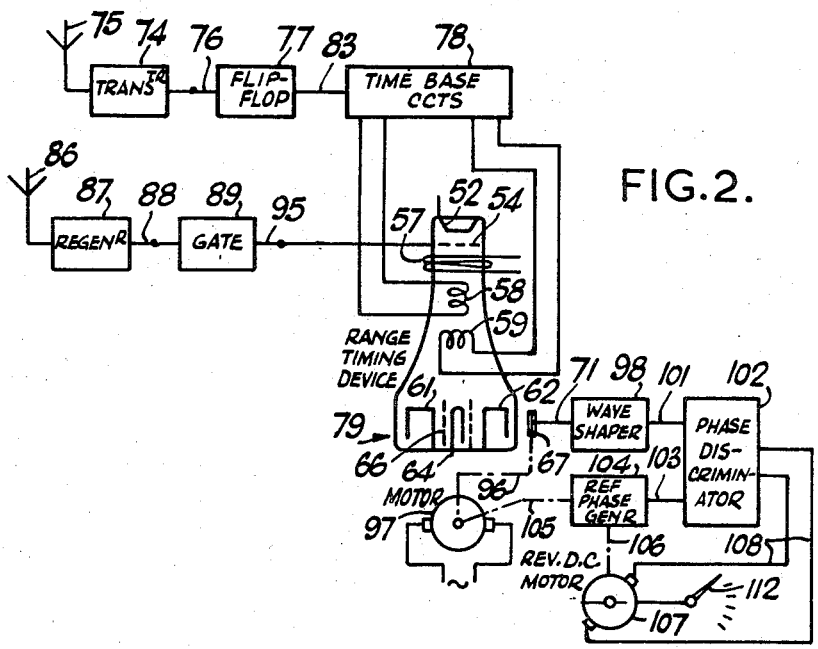
FIG.2.
INVENTOR
JOHN STEWART
BY Irwin S. Thompson
ATTY.

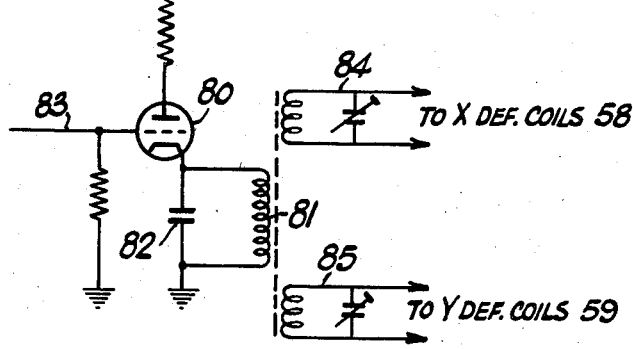
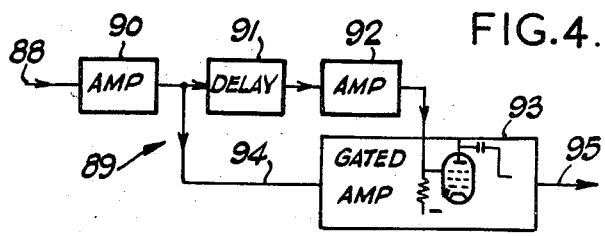
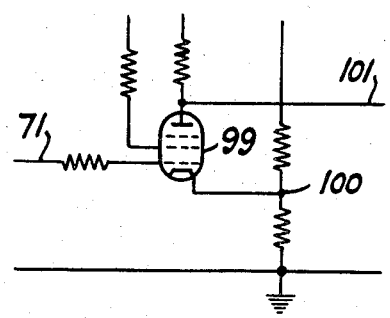

United States Patent Office 2,910,678
Patented Oct. 27, 1959

2,910,678

ELECTRIC SIGNAL SELECTING AND INTEGRATING DEVICE

John Stewart, Edinburgh, Scotland, assignor to Ferranti Limited, Hollinwood, Lancashire, England, a British company Original application April 13, 1953, Serial No. 348,261, now Patent No. 2,792,570, dated May 14, 1957. Divided and this application March 22, 1957, Serial No. 647,925

Claims priority, application Great Britain April 15, 1952

11 Claims. (Cl. 340—212)

This invention relates to an electric signal selecting and integrating device suitable for directing received signals into different channels and then deriving from each of said channels an output signal which is an integrated version of the separate signals received in each of said channels. A particular, although by no means exclusive, application of the invention is to a timing device for use in a radio navigation system as described in my Patent No. 2,792,570, issued May 14, 1957, on application Serial No. 348,261 for Radio Navigational Systems, filed April 13, 1953, from which the present application is a divisional application.

One object of the invention is to provide a signal selecting and integrating device comprising a cathode ray tube electrode assembly, means for causing deflection of the tube beam over a predetermined scanning path, charge receiving elements at different positions along said scanning path and operated upon by said beam, circuit means for applying received signals to modulate said beam and sensing means cooperating with said charge receiving elements for determining which of said elements has acquired the greatest charge.

Another object of the invention is to provide a signal selecting and integrating device comprising a cathode ray tube electrode assembly, means for causing deflection of the tube beam over a predetermined circular scanning path, a plurality of secondary emissive elements at spaced circumferential positions around said circular scanning path and each operable upon by said beam in turn, circuit means for applying received signals to modulate said beam to increase its intensity, a plurality of charge receiving surfaces electrically connected one to each of said secondary emissive elements, said charge receiving surfaces being arranged around a circular path, a rotatable collector plate movable past each of said charge receiving surfaces in turn, a driving motor for continuously rotating said collector plate, a reference pulse generator operated by said driving motor and producing a single output pulse once for each revolution of said collector plate, said reference pulse generator including control means for adjusting the phase of said output pulse relative to the angular position of said collector plate, an output signal connection from said collector plate, a phase discriminator device having two input terminals connected respectively to said collector plate signal connection and said reference pulse generator and output terminals for delivering an error signal, a further driving motor supplied from said output terminals of said phase discriminator device, a driving connection between said further motor and said control means of said reference pulse generator and an indicator coupled to said further motor.

A further object of the invention is to provide an improved form of cathode ray tube device for effecting selection of incoming electric signals and providing output voltages representing the integration of the signals received at different time intervals.

The above and other objects and features of the invention will be more readily understood from the following description of one practical embodiment thereof given, by way of illustrative example only, with reference to the accompanying drawings, in which:

Fig. 1 is a longitudinal sectional view of one form of signal selecting and integrating device according to the invention.

Fig. 2 is a block schematic diagram of the arrangements utilising the device of Fig. 1 in the apparatus provided in a mobile craft for a radio navigation system as described in my aforesaid application Serial No. 348,261.

Figs. 3, 4 and 5 illustrate in greater detail the arrangement of certain elements of the mobile craft apparatus shown in Fig. 2.

Referring first to Fig. 1 which shows a cathode ray tube device according to the invention for directing received signals in a radio navigation system into sequential channels, such cathode ray tube device comprises a cylindrical shaped tubular envelope 50 at one end of which is located a normal electron beam gun assembly 51 comprising a cathode 52 with its associated internal heater 53 and surrounded by the usual beam modulating electrode 54 and an apertured plate 55 set in a plane normal to the axis of the gun assembly. The central cylindrical portion of the tubular envelope 50 is provided on its inner surface with an anode-forming conductive coating 56 and is surrounded externally with an electromagnetic focusing coil 57 and X- and Y-beam deflecting coils 58 and 59. Towards the opposite end of the tubular envelope 50 there is disposed, in a position normal to the tube axis, a screen 60 having a plurality of apertures therethrough in positions located on a circle concentric with the tube axis. This screen 60 is positioned adjacent to a plurality of circumferentially arranged dynodes each including a secondary emitting surface 61 facing a related aperture in the screen 60. Each of these surfaces 61 is associated with an interconnected capacitive output surface 62 lying closely adjacent the wall of the tubular envelope. In addition, each emitting surface 61 is associated with an interconnected discharge surface 63 which lies opposite to a separate discharge cathode 64 having an internal heater 65 and a surrounding control grid electrode 66. The various dynodes, whose number depends upon factors which will be referred to later, are supported upon a ceramic ring 68. Each of the capacitive output surfaces 62 is adapted to be passed over in turn by a rotating collector plate 67 which is movable around the outside of the tubular envelope 50 in a circular path which is coaxial with the envelope and which is in close spaced relationship to the outer surface of the envelope wall. The various electrical connections to the tube elements are effected by way of connection pins 69 and 70 fixed in the opposing end walls of the envelope.

In the operation of such a device, the various electrodes such as the coating 56, the heaters 53 and 65 and the electrodes 54 and 66 are supplied with suitable operating potentials so that the electron beam formed at the cathode 52 and its associated focusing means is directed through the central aperture in the plate 55 into the central region of the tube and towards the apertured screen 60. The beam deflecting currents applied to the X- and Y-beam deflecting coils 58 and 59 are so adjusted that this beam sweeps over a circular path coincident with the series of circumferentially disposed apertures in the screen 60 whereby the beam passes through such apertures to impinge in turn upon the secondary emitting surface 61 of each of the dynodes.

Emission from the discharge cathode 64 is normally held suppressed by the application of a suitable bias potential to the associated control electrode 66. If, under these conditions, the tube beam from the gun assembly 51 is either cut-off or is of low intensity, no secondary emission will take place from any of the surfaces 61 and in consequence the potential of the associated capacitive output surface 62 will not sensibly alter. If, however, at the instant of impingement of the tube beam upon a given dynode, the beam intensity is increased to a value sufficient to produce secondary emission from the surface 61 of that dynode there will be a consequential alteration of potential on the associated output surface 62 and such change of potential will be sensed by the rotating collector plate 67 as it passes over such surface 62 during its movement around the outside surface of the envelope. There will in consequence be delivered on the output connection 71 from such collector plate, an output voltage pulse indicative of the altered potential level of that particular dynode. The intensity of the tube beam, in the present application of the device, is controlled by input signals applied to the modulating electrode 54 of the gun assembly 51 and if several input signals in succession cause repeated bombardment of the same dynode, such input signals will effectively be integrated in the form of an increased amplitude output pulse from the rotating collector plate 67 as it passes over the capacitive output surface 62 associated with that particular dynode while, by reason of the persistence of the charge upon the dynode, a memory or storage effect is produced.

The stored charge or charges on the various dynodes may be removed at any time by pulsing the control electrode 66 associated with the discharge cathode 64 positively so as to allow space current to flow from the discharge cathode thereby equalizing the potentials on the various dynodes.

One practical application of the device shown in Fig. 1 in the mobile craft equipment for a radio navigation system as described in my aforesaid Patent No. 2,792,570, will now be described with reference to Fig. 2 which shows part of Fig. 2 of the aforesaid parent application. In Fig. 2 an interrogating transmitter 74 is coupled to a, preferably omni-directional, aerial system 75. This interrogating transmitter may be of any suitable type such as are currently used in responder devices and is preferably of the continuously operating self-modulating type whereby it radiates a continuous series of pulsed interrogation signals at a suitable pulse repetition frequency such that at least a few separate interrogation/response cycles can take place between the craft equipment being described and a beacon station of the rotating beam type in each of the time periods while the craft is within the aerial beam of such beacon station. A convenient pulse repetition frequency is about 100 cycles per second which, with a 5° width beam at the beacon station and with the beam rotating at 20 revolutions per minute, allows at least 4 and possibly 5 separate interrogations of the beacon station by the mobile craft apparatus each time the craft is located within the field of the rotating beacon beam.

The modulating pulse developed within the transmitter 74 is also available externally and is applied by way of lead 76 to a flip-flop type trigger circuit 77 which controls a time base generating circuit 78 which will be referred to later and which provides deflection potentials to the X- and Y-beam deflecting coils 58 and 59 of a timing device 79 consisting of a cathode ray tube device as already described in connection with Fig. 1. The flip-flop circuit 77 is of conventional form, e.g. of the monostable multi-vibrator type referred to on pages 166–167 of vol. 19, M.I.T. Radiation Laboratory Series, and provides an output in the form of a negative-going square pulse commencing in synchronism with the outgoing interrogating pulse from the transmitter 74 radiated through the aerial 75 to the distant rotating beam beacon station. The aforesaid negative-going square pulse is arranged to persist for a time period sufficient to cover the time elapsing between the radiation of the outgoing pulse and the reception of a subsequent response pulse from the beacon station. A convenient time, in the particular example being described, is 4 milliseconds.

A convenient form of the time base generating circuit 78 is shown in Fig. 3 and comprises a pulsed or ringing oscillator valve circuit such as that described on pages 140 et seq. of the aforesaid vol. 19 of M.I.T. Radiation Laboratory Series. The circuit shown in Fig. 3 is substantially that of Fig. 4-44 of the aforesaid reference consisting of a valve 80 having an oscillatory circuit of parallel-connected inductance 81 and capacitance 82 in its cathode lead. The valve 80 is normally conductive and no oscillation takes place in the oscillatory circuit. When the valve is suddenly cut-off by the application of the negative pulse output from the flip-flop circuit 77 to its control grid by way of lead 83, the oscillatory circuit 81, 82 oscillates or "rings" for a few cycles. The frequency of oscillation of the circuit 81, 82 is related to the maximum range to be indicated and in the particular present example is of the order of 1,000 c.p.s.

The associated beacon station is provided with means, as described in greater detail in the aforesaid parent application, whereby there is radiated in reply to an interrogating pulse, a first pulse, referred to as the P pulse, at a fixed predetermined time after the instant of reception at the beacon station of the interrogating pulse from the transmitter 74 and then a second pulse, referred to as the T pulse, after a further fixed time delay. As explained in the aforesaid parent application, it is the second of these two pulses, i.e. the T pulse, which is used to indicate range measurement between the interrogating point and the beacon station and the respective delay times are so arranged that the complete oscillation cycle of the output from the oscillatory circuit 81, 82 covers the time period when such range indicating T pulse response signal is received at the interrogating point on the mobile craft. The first part of the oscillation cycle is not used owing to the fact that it is usually of somewhat distorted form. The requisite sinusoidal currents in quadrature relationship for energising the respective X- and Y-deflecting coils 58, 59 of the device as shown in Fig. 1 are derived from tuned circuits 84, 85 loosely coupled to the inductance 81. These circuits are respectively tuned in the usual and well known manner to provide currents having a 45° lead and a 45° lag respectively on the current in the inductance 81 so that when they are applied to the aforesaid X- and Y-deflecting coils they produce a circular sweeping motion of the beam from the electron gun assembly 51 in the tube of Fig. 1. It will be understood that suitable amplifier means may be incorporated if necessary to ensure the requisite amplitude of the deflection currents flowing in the coils 58, 59.

Reverting again to Fig. 2, the response signals from the beacon station are received by receiving aerial 86 and are applied to a pulse signal receiver 87 which may again be of any suitable known form, e.g. as currently used in responder devices. The receiver output on lead 88, comprising the response pulses provided by the beacon station at each response cycle and including the aforesaid first and second response pulses P and T, is applied to a gating device 89 whose form is shown in greater detail in Fig. 4.

This device 89 comprises an amplifier circuit 90 whose signal output is applied by way of a delay circuit 91 to a further amplifier 92, the output of which is applied as an unblocking control voltage for a gated amplifier 93 whose input terminal is supplied over lead 94 with the output signals from the amplifier circuit 90 and whose output terminal is connected by way of lead 95 to the beam modulating electrode 54 of the cathode ray tube gun assembly 51 of the device shown in Fig. 1. The amplifiers 90, 92 are of conventional form while the delay circuit 91 may be of the L/C type or of the magnetostrictive type as described in British Patent No. 667,218.

The gated amplifier 93 includes a pentode valve whose suppressor grid is normally held below the anode current cut-off point and is arranged to be raised above such cut-off point to make the amplifier operative by reason of the signal output supplied thereto from the amplifier 92.

The delay time of the delay circuit 91 is made equal to the time interval between the first and second response pulses P and T radiated by the distant beacon station, e.g. 50 microseconds in the particular example at present being considered. As a result, the first or P pulse does not pass through the amplifier 93 in view of its normal blocked condition but such first pulse, by reason of its passage through the delay 91 and its subsequent action, after amplification in amplifier 92, serves as an unblocking medium for such amplifier 93 at the instant of subsequent arrival of the second or T pulse from the distant beacon station whereby such T pulse alone passes through the amplifier 93 to the beam modulating electrode 54 of the timing device 79.

Returning to Fig. 2, the timing device 79 has its rotating collector plate 67 mechanically coupled to the spindle 96 of an electric motor 97 which is continuously energised from a suitable supply source. The output circuit connection 71 from such collector plate 67 is connected to a wave shaping circuit 98 which may be of the form shown in Fig. 5 and comprises a clipping circuit including a valve 99 whose cathode is biased positively by connection to a tapping on a potentiometer network 100 between a source of positive potential HT+ and earth so that all small amplitude noise and random signals are removed and only output signals of appreciable amplitude are passed on by way of its anode output lead 101 as well defined and squared pulses. The output lead 101 of the wave shaping circuit 98 is connected to one input terminal of a phase discriminator circuit 102.

The other input of the phase discriminator circuit 102 is supplied over lead 103 with the output from a reference phase generator 104 which provides a train of reference pulses resembling those obtained from the wave shaping circuit 98 and occurring once during each revolution of the collector plate 67 and adjustable in its timing relative to the angular position of such plate. This reference phase generator 104 resembles an alternator having its normal stator mechanically rotatable as well as its usual rotor. The rotor is mechanically coupled by coupling means 105 to the spindle 96 of the motor 97 so as to rotate in unison with the collector plate 67. The adjustable-position stator, however, is arranged to be moved through the intermediary of coupling means 106 by a reversible D.C. electric motor 107.

The phase discriminator circuit 102 may be of any known suitable type capable of comparing the respective phases of two pulse-form input waveforms and then providing a D.C. error signal which, in the event of non-synchronism of such pulses, is of either polarity depending upon the respective phase relationship of the applied pulses and which is suitable for operating the motor 107 in one or the other of its two alternative directions of rotation such as will tend to correct the phase error between the applied pulse inputs to the discriminator circuit 102. Examples of such circuits are to be found in section 12–12 of "Electronic Instruments," vol. 21 of the M.I.T. Radiation Laboratory Series, 1948. The output from such discriminator circuit 102 is fed by way of leads 108 to the motor 107. The spindle of the motor 107 is also provided with a pointer 112 for co-operation with a fixed scale which indicates range values.

In the operation of the mobile craft apparatus of Fig. 2 as described above, the transmitter 74 is continuously operative to transmit interrogating pulses but whenever the mobile craft in which the apparatus is carried is out of the field of the rotating beam of the distant cooperating beacon station, no response signals are received by the aerial 86. Immediately the craft is within the beam of the beacon station the response signal train from the beacon station, including the aforesaid pulses P and T, will become available and the cycle of events is as follows. At each outgoing interrogation pulse the time base generating circuit 78 of the range timing device 79 will be operated in response to the triggering of the flip-flop circuit 77 and the beam of the tube would, if not suppressed, perform a number, e.g. four, complete circular sweeps commencing at the instant of rotation of the outgoing interrogating pulse. Initially, however, the tube beam is held suppressed and as the gated amplifier 93 in the gating device 89 (Fig. 4) is blocked, no signals or random noise can reach the beam modulating electrode 54 of the device 79. Upon the arrival of the first or P pulse signal of the response train from the distant beacon station at some particular time, in the present example having a maximum range of about 100 miles, between 50 microseconds (0 mile's range) and 1,060 microseconds (100 miles' range) after the interrogating pulse, dependent upon the actual distance between the mobile craft and the beacon, this first or P pulse response signal is effective upon the gating device 89 to render it conductive at a time 50 microseconds later still, i.e. in coincidence with the arrival of the second or T pulse of the response train from the distant beacon station. This T pulse is accordingly effective upon the beam in the tube 79 to turn such beam on.

In the meantime, the beam deflection waveforms provided by the time base circuit 78 to the deflection coils 58, 59 of the tube 79 have been proceeding on their respective first cycles and depending upon the range value the tube beam will be turned on at some time so as to impinge upon a particular one of the dynodes of the tube thereby altering the potential thereof. During the simultaneous rotation of the associated collector plate 67 an output pulse will be developed upon the output connection 71 to provide a first pulse input to the phase discriminator circuit 102 which is also being supplied continuously with reference pulses from the generator 104. In the event of non-alignment of these two input pulses, the phase discriminator circuit 102 provides an error signal on its output leads 108 which serves to operate the motor 107 to correct the timing of the reference pulse waveform provided by the generator 104 so as to bring the latter into alignment with the pulses delivered from the collector plate 67. At the same time the position of the pointer 112 is altered to indicate the particular range value which is related to the bombarded one of the dynodes of the tube 79.

The remaining transmissions that occur whilst the craft is still in the beam of the beacon station result in the similar reception of further groups of response pulses including such pulses P and T from the beacon station at each successive interrogation. As during this period the craft remains substantially at the same distance from the beacon station it follows that in the timing device 79 the selected signals, i.e. the second or T pulses, are directed into the same dynode channel as in the first cycle. The net result is that at the end of the four or more successive interrogation cycles which occur while the craft is within the field of the beam, a strong signal is built up on one dynode channel only in the timing device 79, this channel representing the range of the craft from the beacon station and the display pointer 112 being so operated as to indicate visually the value of this range quantity.

All other signals received while the craft is in the beam of the beacon station will have more or less random timing and will be fairly evenly distributed over the various channels with, in consequence, little or no effect on the visual display. Even a signal which has been transmitted steadily during this short period will almost certainly have been directed sequentially into different channels and will not have built up during this period to anything approaching the amplitude of the wanted signal. Interrogation signals of substantially the same repetition rate from different mobile craft, even if these are at the same range distance from the beacon station, will not be sufficiently closely synchronised to be directed into the same channel and they will, effectively, constitute random pulses only.

If desired, means may be provided for periodically clearing the timing device 79 of the stored information in the various dynode channels by providing a suitable positive-going pulse to the control electrode 66 associated with the discharge cathode 64 (Fig. 1). This may be effected by suitable timing means such as a clock device operating to close the pulsing circuit at predetermined intervals for instance once per second.

The number of dynodes provided on the tube, e.g. the tube 79, will depend upon the degree of accuracy required for the resulting indications. Thus, in the case of the range tube 79 already described, if it is required to deal with a maximum range of 100 miles with measurement to the nearest mile, 100 dynodes would be required, whereas if the range is to be only 20 miles measured to the nearest ½ mile, then only 40 dynodes will be required. It will be understood that the various specific time delay and other values quoted above are by way of example only and may, in practice, vary considerably according to requirements.

I claim:

1. A signal selecting and integrating device comprising a cathode ray tube gun electrode assembly, means for causing deflection of the tube beam over a predetermined scanning path, charge receiving elements including charge surfaces at different positions along said scanning path and operated upon by said beam, circuit means for applying received signals to modulate said beam and capacitive sensing means including a common capacitive electrode movable relatively to said charge surfaces for determining which of said surfaces has acquired the greatest charge.

2. A signal selecting and integrating device comprising a cathode ray tube gun electrode assembly, means for causing deflection of the tube beam over a predetermined circular scanning path, a plurality of secondary emissive elements at different circumferential positions around said scanning path and each operable upon by said beam in turn, circuit means for applying received signals to modulate said beam to increase its intensity, individual charge receiving surfaces connected one to each of said secondary emissive elements and a movable capacitive collector plate movable past each of said charge receiving surfaces in turn to determine the respective charges thereon.

3. A signal selecting and integrating device comprising a cathode ray tube gun electrode assembly, means for causing deflection of the tube beam over a predetermined circular scanning path, a plurality of secondary emissive elements at spaced circumferential positions around said circular scanning path and each operable upon by said beam in turn, circuit means for applying received signals to modulate said beam to increase its intensity, a plurality of charge receiving surfaces electrically connected one to each of said secondary emissive elements, said charge receiving surfaces being arranged around a circular path, a rotatable collector plate movable past each of said charge receiving surfaces in turn, a driving motor for continuously rotating said collector plate, a reference pulse generator operated by said driving motor and producing a single output pulse once for each revolution of said collector plate, said reference pulse generator including control means for adjusting the phase of said output pulse relative to the angular position of said collector plate, an output signal connection from said collector plate, a phase discriminator device having two inputs connected respectively to said collector plate signal connection and said reference pulse generator and having an output for delivering an error signal, a further driving motor supplied with said output of said phase discriminator device, a driving connection between said further motor and said control means of said reference pulse generator and an indicator coupled to said further motor.

4. A signal selecting and integrating device according to claim 3 which includes a further discharge cathode adjacent said secondary emissive elements and a control electrode adjacent said discharge cathode for governing its effectiveness to remove any charge acquired by said secondary emissive elements.

5. A signal selecting and integrating device comprising an evacuated envelope containing a cathode ray tube gun assembly for providing an electron beam capable of deflection within said tube over a predetermined scanning path, a plurality of secondary emissive charge receiving elements within said tube at spaced positions along said beam scanning path and capacitive sensing means including a movable capacitive electrode for sensing the charge acquired by each of said secondary emissive elements.

6. A signal selecting and integrating device comprising an evacuated envelope including a cathode ray tube electrode gun assembly, a plurality of secondary emissive elements in spaced relationship to said gun assembly and a plurality of charge receiving surfaces connected one to each of said secondary emissive elements and located within said envelope and capacitive sensing means externally of said envelope for determining the respective charges acquired by each of said charge receiving surfaces.

7. A signal selecting and integrating device comprising an evacuated envelope of elongated tubular form, a cathode ray tube electrode gun assembly at one end of said tubular envelope for providing an electron beam directed within said envelope towards the opposite end, a plurality of secondary emissive plate-like members disposed in a radial plane of said tube at spaced angular positions with respect to the axis of the tube and at a position adjacent the opposite end of said tube and a plurality of charge receiving members connected one to each of said secondary emissive elements, said charge receiving elements being disposed in close spaced parallel relationship to the circumferential wall of the tubular envelope and capacitive sensing means movable around the outside of said circumferential envelope wall past each of said charge receiving members in turn.

8. A signal selecting and integrating device comprising an evacuated envelope of elongated tubular form and enclosing a cathode ray tube electrode gun assembly adjacent one end of the envelope for directing an electron beam through the bore of the tube towards the opposite end of the envelope, a plurality of secondary emissive elements disposed around a circular path coaxial with the tube envelope in a radial plane adjacent the opposite end of the tubular envelope, a plurality of charge receiving surfaces, one for each of said secondary emissive elements, said charge receiving surfaces being connected to said elements and disposed to lie in close spaced parallel relationship to the circumferential wall of the envelope, a plurality of charge dispersing members one for each of said secondary emissive elements and connected thereto, said charge dispersing members being arranged around a discharge cathode surrounded by an emission control electrode.

9. A signal selecting and integrating device comprising an evacuated envelope containing a cathode ray tube electron gun assembly for providing an electron beam capable of deflection within said tube over a predetermined scanning path, an apertured plate disposed in the path of said beam and having a plurality of apertures at spaced positions along said beam scanning path, a plurality of secondary emissive charge receiving elements within said tube at spaced positions along said beam scanning path, one behind each of said apertures in said apertured plate and capacitive sensing means including a movable capacitive electrode for sensing the charge acquired by each of said secondary emissive elements.

10. A signal selecting and integrating device comprising an evacuated envelope including a cathode ray tube electron gun assembly, a plurality of secondary emissive elements in spaced relationship to said gun assembly and a plurality of charge receiving surfaces connected one to each of said secondary emissive elements, said charge receiving elements being mounted closely adjacent the inside surface of the wall of said envelope for co-operation with capacitive sensing means located externally of said envelope wall for determining the respective charges acquired by each of said charge receiving surfaces.

11. A signal selecting and integrating device comprising an evacuated envelope of elongated tubular form, a cathode ray tube electron gun assembly at one end of said tubular envelope for providing an electron beam directed through said envelope towards the opposite end, a plurality of secondary emissive plate-like members disposed in a radial plane of said tube at spaced angular positions with respect to the axis of the tube and at a position adjacent the opposite end of said tube, an apertured plate disposed between said gun assembly and said plate-like members, said plate having a plurality of apertures, one for each of said plate-like members in positions aligned respectively between said gun assembly and the related plate-like member and a plurality of charge receiving members connected one to each of said secondary emissive plate-like members, said charge receiving elements being disposed within said envelope in close spaced parallel relationship to the inside surface of the circumferential wall of the tubular envelope for co-operation with external capacitive sensing means movable around the outside surface of said circumferential wall past each of said charge receiving members in turn.

References Cited in the file of this patent

UNITED STATES PATENTS

| | | |
|---|---|---|
| 2,430,038 | Wertz | Nov. 4, 1947 |
| 2,559,606 | Dubin | July 10, 1951 |
| 2,607,903 | Labin | Aug. 19, 1952 |